No. 724,813. PATENTED APR. 7, 1903.
J. K. COCHRAN.
COTTON COMPRESS.
APPLICATION FILED FEB. 11, 1902.
NO MODEL. 4 SHEETS—SHEET 1.
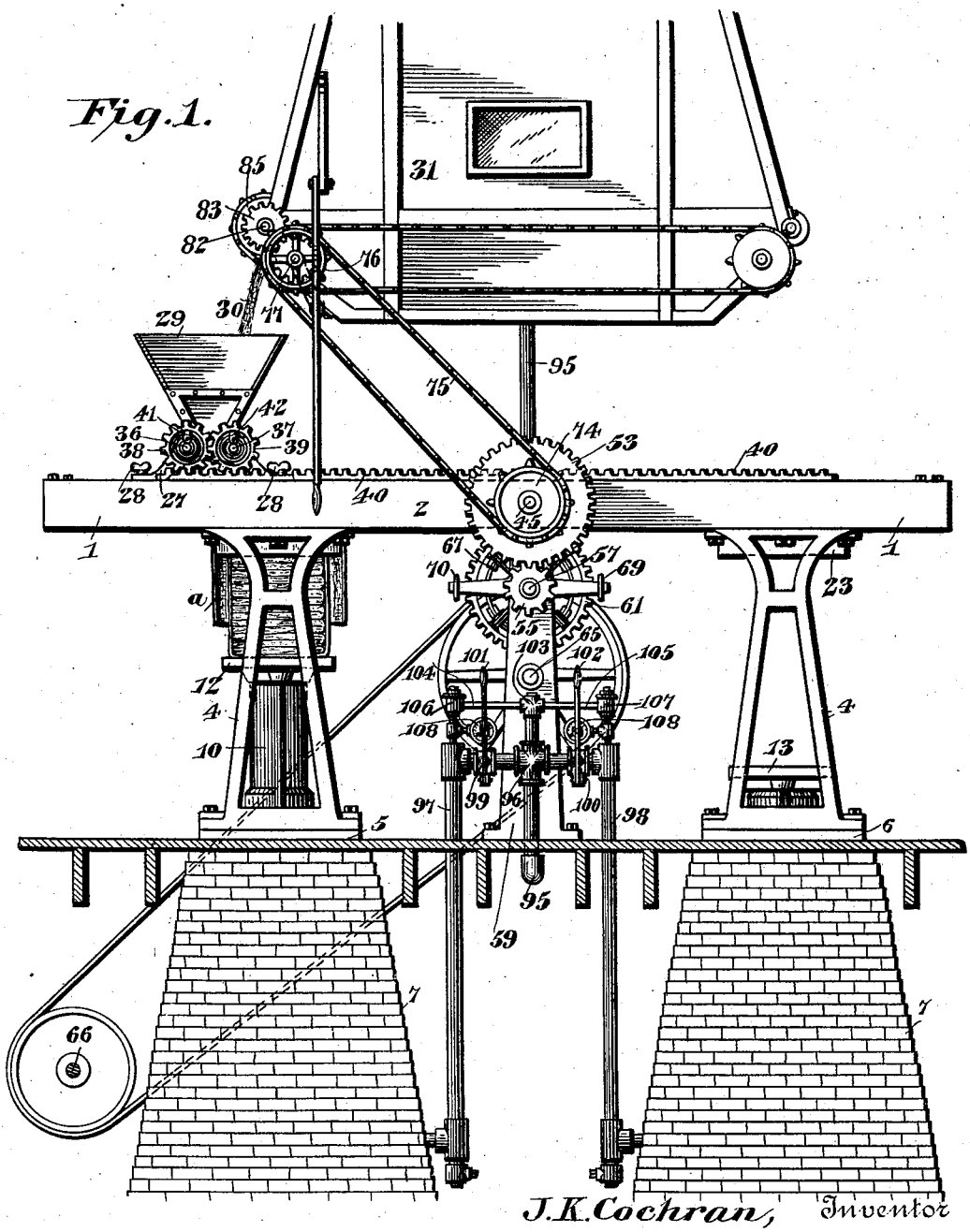

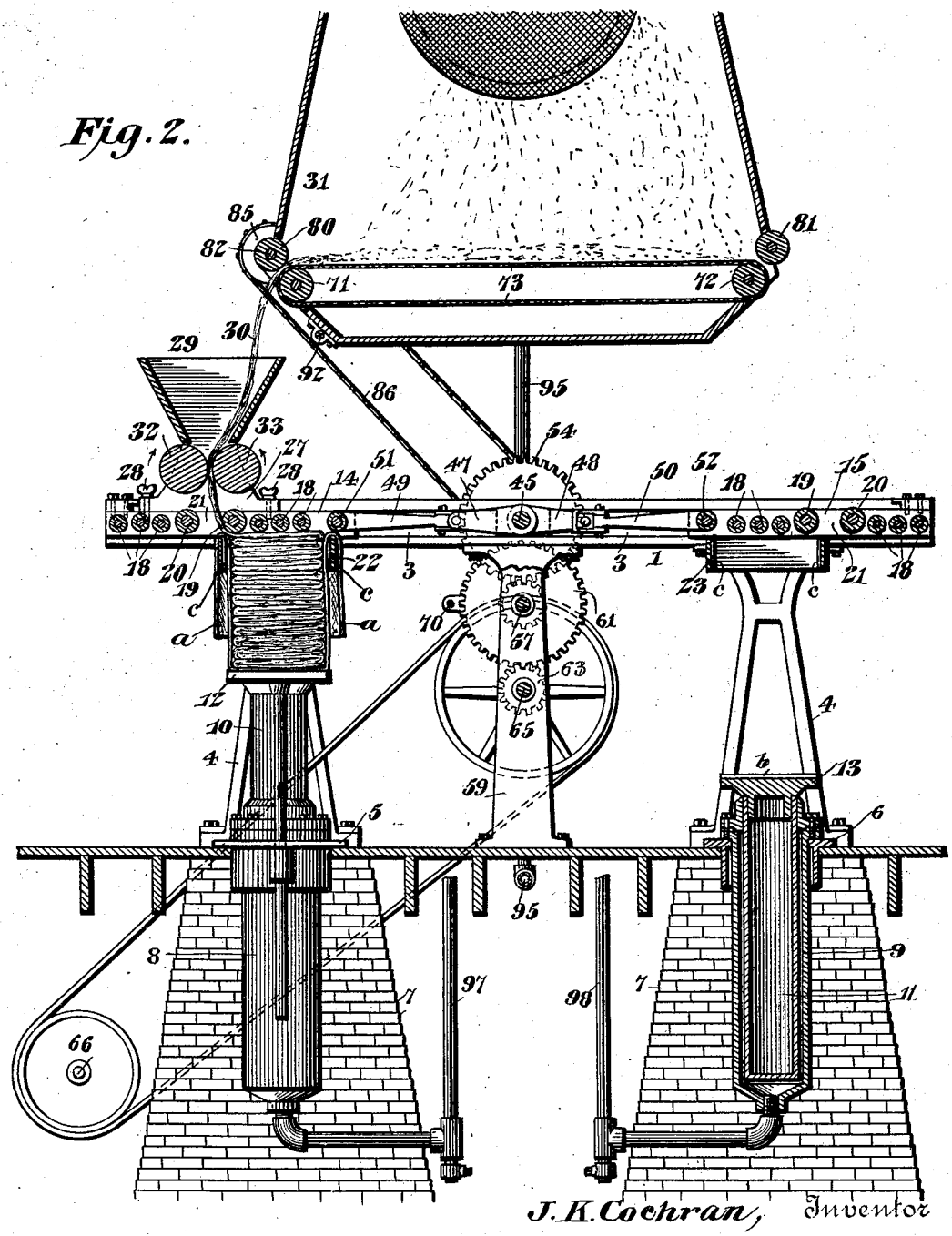

No. 724,813. PATENTED APR. 7, 1903.
J. K. COCHRAN.
COTTON COMPRESS.
APPLICATION FILED FEB. 11, 1902.
NO MODEL. 4 SHEETS—SHEET 3.
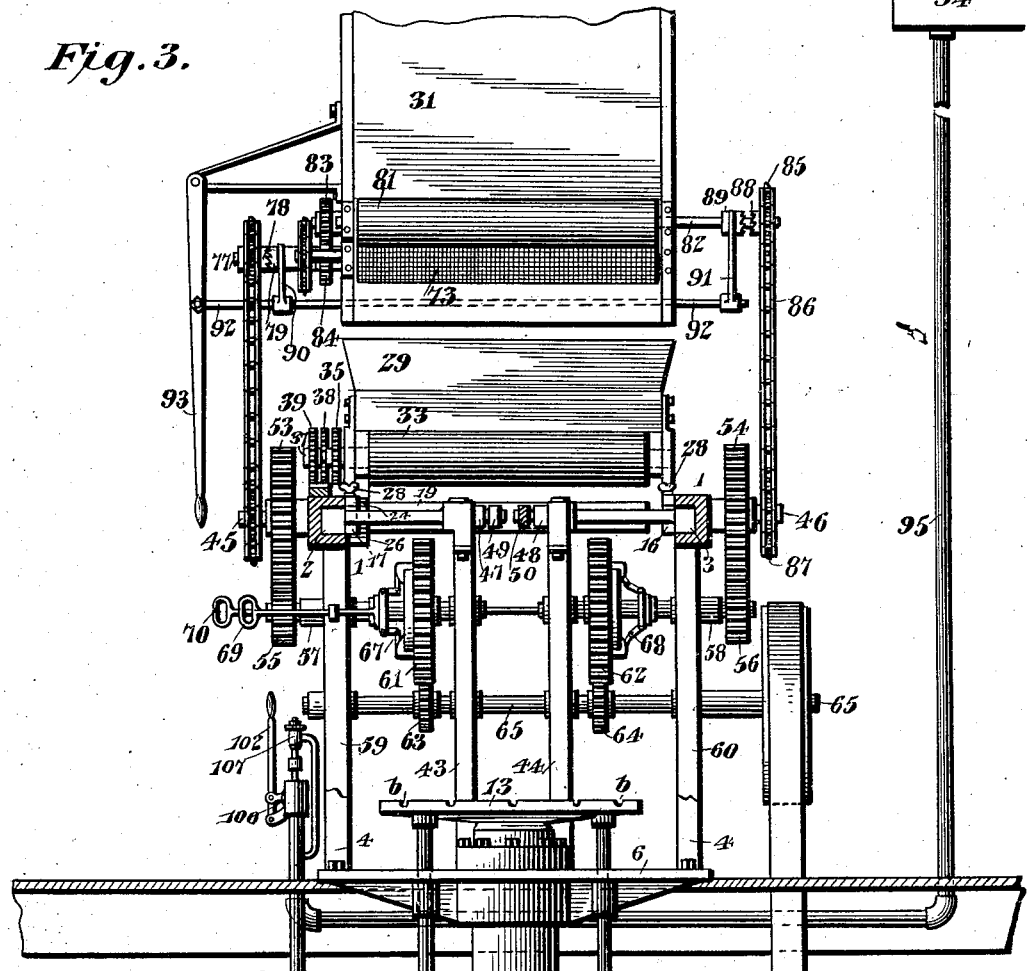
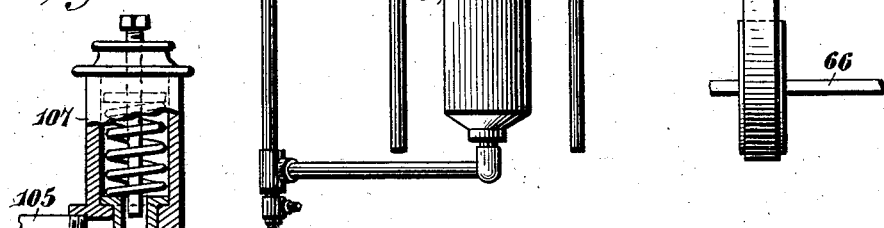
J. K. Cochran, Inventor

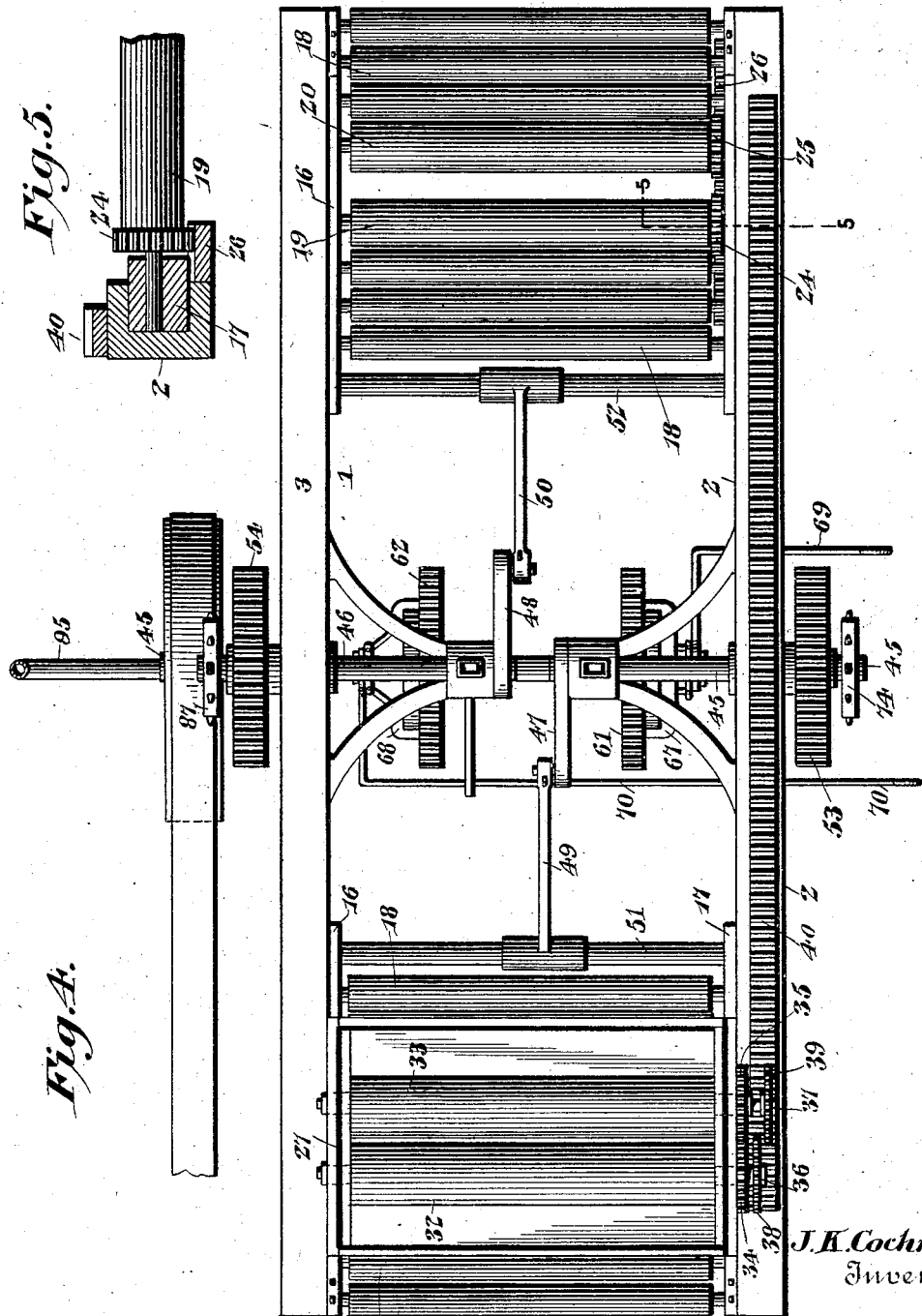

UNITED STATES PATENT OFFICE.

JAMES K. COCHRAN, OF CHICAGO, ILLINOIS, ASSIGNOR OF ONE-HALF TO JOSEPH A. SIMPSON, OF CHICAGO, ILLINOIS.

COTTON-COMPRESS.

SPECIFICATION forming part of Letters Patent No. 724,813, dated April 7, 1903.

Application filed February 11, 1902. Serial No. 93,612. (No model.)

*To all whom it may concern:*

Be it known that I, JAMES K. COCHRAN, a citizen of the United States, residing at Chicago, in the county of Cook and State of Illinois, have invented a new and useful Cotton-Compress, of which the following is a specification.

My present invention relates to a novel cotton-compress of that type known as "roller-presses," and comprehending bale forming and compressing mechanism comprising a receding platen and a bat folding and compressing device operated to fold a bat back and forth upon the platen in successive layers, which are compressed in detail as the bale is formed.

The object of the invention is to produce a simple and efficient press organized and arranged to form bales of cotton of uniform shape and size and of any desired density, at least four sides of the bale being perfectly flat to provide a perfect package for storage and transportation.

A further object is to form the bale and compress it to standard or greater density at a single operation by simultaneously compressing the bat in detail and the bale in bulk as the bat is fed to the press and folded layer upon layer between the compression members, whereby the objectionable hard center of round lap bales is avoided and the density of the cotton made uniform throughout the bale without interrupting the continuity of the bat or sheet of fiber.

Another object of the invention is to provide for the formation of the bat and its detailed compression at a point in close proximity to the point at which the bat is delivered between the compression members of the press, so that the bat will be folded between the compression members before it has had time to expand after its detailed compression.

Still other objects of the invention are to insure the delivery of the compressed bat at exactly the rate of speed at which the compression members travel and to provide for the covering and tying of the bale while the latter is still subjected to the maximum compression, this latter object being preferably attained by a novel construction of the compression mechanism, which enables the latter to be utilized actively in the process of the method of bagging and tying.

In addition to these general primary objects are others subordinate thereto, such as the provision of a double press comprising duplicate sets of compression mechanism, each of which is capable of forming and compressing a bale while the completed bale in the other set is being covered and tied; also, the provision of means whereby the loose bat may be supplied to a bat forming and compressing device arranged for alternate coöperation with the baling sets of the press, and, finally, the origination of an effective arrangement of mechanism for opposing such hydraulic resistance to the recession of the platen as may be necessary to the production of a bale of any desired density.

To the accomplishment of these various objects and others which will hereinafter appear the invention contemplates in its preferred embodiment that construction and arrangement of parts hereinafter more fully described, illustrated in the accompanying drawings, and succinctly defined in the appended claims.

In said drawings, Figure 1 is a side elevation of my cotton-compress complete, in connection with which is shown the lower portion of the condenser-casing, arranged to supply a loose bat to the press. Fig. 2 is a longitudinal sectional elevation of the subject-matter of Fig. 1. Fig. 3 is an end elevation, partly in section, of the same subject-matter. Fig. 4 is a top plan view of the press. Fig. 5 is a detail sectional elevation showing the manner in which the compression-rollers are rotated, through the movement of the carriage, on the line 5 5 of Fig. 4; and Fig. 6 is a detail sectional elevation of one of the pressure-regulating or relief valves.

Like numerals of reference are employed to designate corresponding parts throughout the several views.

The frame of the press (indicated by the numeral 1) comprises a pair of parallel horizontally-disposed tracks or guides 2 and 3 of angular cross-sectional contour and separated by an interval approximately equal to the length of the proposed bale. These tracks or guides are supported upon suitable standards 4, arranged in pairs adjacent to the opposite ends of the frame and bolted or otherwise secured to the guides and to the opposite ends of a pair of bed-plates 5 and 6, supported upon suitable foundations, preferably in the form of piers 7, of masonry, as shown. At points intermediate of their ends the bed-plates 5 and 6 are apertured for the reception of the pendent cylinders 8 and 9, supported at their upper ends by the bed-plates and disposed for the reception of hollow cylindrical rams or plungers 10 and 11, which support the press-platens 12 and 13 and constitute elements of the hydraulic resistance mechanism, which in a manner to be hereinafter described opposes any desired resistance to the recession of the platens as the bales are formed. The platens 12 and 13 are of a width and length corresponding to the width and length of the proposed bales and constitute the lower compression members of the two sets of baling mechanisms with which the press is equipped. The upper compression members of the press are in the form of reciprocatory carriages 14 and 15, each of which comprises a pair of slides 16 and 17, slidably mounted in the tracks or guides 1 and supporting the opposite ends of a series of transverse compression-rollers 18. The series of rollers constituting the equipment of each carriage is divided into two groups, preferably of four rollers each, the contiguous rollers located at the inner ends of the groups being of somewhat larger diameter than the others and constituting what may be termed the "main" compression-rollers 19 and 20, the interval between which forms a feed-throat 21. These carriages are designed to be reciprocated for the purpose of folding a bat of cotton back and forth above the platens under the compression induced by the accumulation of fiber between the compression-rollers and platens, resisted by hydraulic resistance opposed to the recession of the plungers 10 and 11. This bat is fed down through the throat 21 to the upper face of the platen, which during the initiation of the bale is located close to the under face of the upper compression member in the form of the compression-rollers 18. The length of the folds or layers, which are disposed successively one upon another, will therefore be determined by the extent of the reciprocatory movement of the upper compression member or carriage. As it is necessary to form the bales of uniform dimensions and with at least four perfectly flat sides, I have found it to be desirable to provide compression-collars or shapers 22 and 23 immediately under the upper compression members or carriages and directly over the platens 12 and 13. These collars are bolted or otherwise secured to the tracks or guides and are less than a foot in height, as it is only necessary to mold or shape that portion of the bale which has just been and is being fed between the compression members, the great pressure to which the bale is subjected serving to maintain the bale in proper form after it is moved below the collar by the recession of the platen. In other words, I eliminate the usual baling-chamber and substitute in lieu thereof a shallow compression-collar, which serves to mold, form, or shape that portion of the bale lying directly under the upper compression member, but leaves exposed that greater portion of the bale extending between the lower edge of the compression-collar and the subjacent platen. The several compression-rollers, with the exception of the main compression-rollers 19 and 20, are mounted to rotate idly by frictional contact with the fibrous surface of the bale, but as the main compression-rollers 19 and 20 are brought alternately in direct contact with the bat and serve to assist in feeding the same to the compression-collar these rollers are designed to be positively rotated at exactly the rate of speed at which the bat is fed to the feed-throat 21 by the action of the bat forming, feeding, and compressing mechanism, to be hereinafter mentioned. A simple method of communicating this positive movement to the main compression-rollers comprehends their equipment with terminal pinions 24 and 25, meshing with a fixed rack 26, projecting inwardly from one of the main tracks or guides, as best shown in Figs. 3 and 4. Thus as the slide or carriage is reciprocated the main compression-rollers will be rotated in one direction or the other, as the case may be, to properly fold and refold the bat and to assist in the compression of the bale.

Having ascertained the manner in which each of the two sets of baling mechanisms is organized and how the upper and lower compression members coöperate to form a bale from a continuous bat folded back and forth and subjected to the necessary compression, we now come to a consideration of the mechanism employed alternately in connection with each set of compression members for the purpose of forming the bat and subjecting it to an initial compression at a point immediately adjacent to the feed-throat and for feeding the bat to said throat at the proper rate of speed relative to the speed of the upper compression member before the bat shall have had time to expand after such initial compression. This bat forming, compressing, and feeding mechanism comprehends a frame 27, detachably secured to one of the carriages, as by thumb-bolts 28, passed through the supporting-feet of the frame and into the slides 16 and 17. The upper portion of this frame 27 is constructed to form a hopper 29, designed to receive a loose bat 30 from one side of a condenser 31 and to insure the delivery of said bat between the bat forming, compressing, and feeding rolls 32 and 33, located at the bottom of the hopper and journaled in suitable bearings in the opposite ends of the frame 27. The interval between the rolls 32 and 33, which constitute in effect the initial bat-compressing rolls, is such as will insure the detailed compression of the bat immediately prior to its delivery to the adjacent feed-throat 21. It is therefore desired to impart rotary movement to these rolls in the direction of the arrows in Fig. 2 irrespective of the direction of movement of the carriage to which this bat-compressing mechanism is attached. To the accomplishment of this purpose these rolls are geared together by intermeshing pinions 34 and 35, keyed upon the trunnions 36 and 37, which latter are also provided with loosely-mounted driving-pinions 38 and 39. The drivers or driving-pinions 38 and 39 are entirely independent of each other, but mesh with a rack 40, extending along the top of the main track or guide 2. (See Fig. 4.) These driving-pinions are loosely mounted upon the trunnions 36 and 37, as stated, but are equipped with oppositely active clutches 41 and 42, (see Fig. 1,) which serve to effect the alternate engagement of the drivers with the trunnions upon which they are mounted. Thus when the carriage 14 is moved to the right the clutch 41 will automatically effect an engagement between the driver 38 and the roll 32 to effect the rotation of the rolls in the proper direction; but when the carriage is moved back—that is to say, to the left—the clutch 41 will automatically release the driver 38 from the roll 32, and the clutch 42 will in turn connect the driver 39 with the roll 33. It will therefore appear that as the rolls are geared together, but are actuated alternately by these independent drivers during the opposite reciprocations of the carriage, said rolls will always rotate in the proper direction and at a predetermined speed relative to the speed of movement of the carriage. By this arrangement the bat will be delivered in a highly-compressed state at exactly the right point and at exactly the rate of speed at which the pressure-rollers travel irrespective of what that speed may be, since the acceleration or retardation of the movement of the carriage or compression member will effect a corresponding acceleration or retardation of the initial compression-rolls.

The condenser-casing 31 is located centrally above the press and is designed, in a manner to be hereinafter described, to deliver a loose bat of cotton at a point above either of the baling sets. For this reason the frame 27 and its complementary rolls and hopper are detachable from one carriage and arranged to be attached to the other in order that upon the completion of a bale between one pair of compression members or within one baling set the hopper 29 and the initial compression-rolls may be transferred to the other carriage to receive and compress a loose bat fed from the opposite side of the condenser-casing and feed the same to the other baling-set while the completed bale is being bagged and tied.

Before proceeding with the description of the condenser or that portion thereof with which my invention is concerned I shall describe the construction and arrangement of the driving or operating mechanism for the press, since this mechanism is geared to the delivery-apron or carrier of the condenser to operate the same.

At a point midway between the baling sets are mounted a pair of standards 43 and 44, provided at their upper ends with bearings for the inner ends of a pair of horizontal crank-shafts 45 and 46, extending through and having bearings in the main tracks or guides 2 and 3. Upon the opposed inner ends of these crank-shafts are mounted cranks 47 and 48, the wrist-pins of which are connected through pitmen 49 and 50 to transverse rods 51 and 52, located at the inner ends of the carriages 14 and 15. Thus as the crank-shafts are rotated the carriages or upper compression members will be reciprocated, and while under ordinary conditions the carriages are operated alternately the cranks are nevertheless spaced apart a sufficient distance to permit the simultaneous reciprocation of both carriages, since, as we shall hereinafter see, one of the carriages is operated to assist in the bagging and tying of a bale while the other carriage is being reciprocated to form a bale at the other end of the press. Various forms of power mechanism may be employed in connection with the crank-shafts; but by preference said shafts are provided at their outer ends with gear-wheels 53 and 54, meshing with pinions 55 and 56, keyed upon the outer ends of a pair of counter-shafts 57 and 58, which latter are journaled at their inner ends in the standards 43 and 44 and at their outer ends in an additional pair of standards 59 and 60, which latter constitute additional supports for the tracks or guides. The counter-shafts 57 and 58 are in turn provided with gear-wheels 61 and 62, meshing with pinions 63 and 64 upon the power-shaft 65, journaled in the standards below the counter-shafts and belted or otherwise geared to suitable power mechanism—as, for instance, the line-shaft 66 of the gin-house. The trains of gearing described serve to connect both carriages with the power-shaft; but as the baling sets are designed to be controlled independently of each other it is evident that some means must be provided for throwing one or the other of the carriages or compression members 14 and 15 into and out of gear as desired. For this reason the gears 61 and 62 are mounted loosely upon the counter-shafts and are equipped with clutches 67 and 68, of any approved form, operated by handles 69 and 70 to fix said gears to the counter-shafts or release them therefrom at the will of the operator. Thus if the handle 69 is drawn back by the operator the gear 61 will be connected to its shaft by means of the clutch 67, and the crank-shaft 45 will be operated to reciprocate the carriage 14 and the bat forming, compressing, and feeding mechanism carried thereby. If now this baling set at the left of the press has completed a bale, the handle 69 is moved back to unclutch the gear 61, and the handle 70 is operated to clutch the gear 62 to the shaft 58 for the purpose of starting the other baling set to initiate a bale at the right of the press, it being of course understood that the hopper and compression-rolls will have been transferred from the carriage 14 to the carriage 15 before the second baling set is put in operation.

We now come to consider the mechanism associated with the press for receiving the cotton from the condenser-cylinders and for delivering the loose bat from one end or the other of the condenser-casing as one or the other of the baling sets is operated to form a bale.

Within the bottom of the centrally-disposed condenser-casing 31 is supported upon rollers 71 and 72 an endless apron or carrier 73, upon which the cotton is precipitated from the condenser-cylinders and formed into a loose bat. The rollers 71 and 72 are located within openings in the opposite side walls of the casing 31, and it will therefore appear that accordingly as the carrier or apron 73 is moved in one direction or the other the loose bat of cotton will be delivered from the proper side of the casing to the hopper 29. I therefore make provision for operating the carrier 73 from the power mechanism of the press. At the outer end of the driving-shaft 45 is mounted a sprocket-wheel 74, geared, as by a chain 75, with a sprocket-gear 76, loosely mounted upon the shaft 77 of the roller 71 and having a clutch-hub 78, designed to be engaged by a clutch-collar 79, splined upon said shaft. If now the crank-shaft 45 is operated to reciprocate the carriage at the left of the press, motion will be transmitted to the carrier or apron 73 to deliver the loose bat from the condenser-casing at the left end thereof. Immediately above the opposite ends of the carrier 73 are mounted a pair of feed-rollers 80 and 81 for effecting just sufficient compression of the fiber to insure the feeding thereof in the form of a loose bat to the hopper 29. The shaft 82 of the feed-roller 80 is geared to the shaft 77 of the roller 71, as by gears 83 and 84, keyed upon the shaft, this operative connection being effected in order to facilitate the reversal of the carrier 73 when it is desired to feed the loose bat from the opposite end of the condenser-casing 31. This will be better understood by reference to Fig. 3 of the drawings, wherein the shaft 82 is shown provided with a loose sprocket-wheel 85, geared, as by a chain 86, to a sprocket-wheel 87, similar to the sprocket-wheel 74, but geared to the outer end of the other crank-shaft 46. The sprocket-wheel 85, like the sprocket-wheel 76, is provided with a clutch-hub 88, disposed for engagement by a clutch-collar 89, splined upon the shaft 82. The sprockets 76 and 85 are disposed for alternate engagement with their shafts, and the clutch-collars 79 and 89 are therefore connected to the outer ends of spanner-arms 90 and 91, extending laterally from a rod 92, mounted for endwise movement to shift the clutch-collars simultaneously and having connection at one end with a clutch-lever 93, located within convenient reach of the operator. By means of this arrangement the carrier 73 may receive its motion from either of the driving-shafts, and notwithstanding the fact that said shafts are operated in the same direction the carrier will be operated in opposite directions by the two shafts, for the reason that in one case the motion is transmitted directly to the roller 71, while in the other case it is transmitted indirectly to said roller through the medium of the shaft 82. Therefore accordingly as one baling set or the other is operated to form a bale the carrier 73 will be moved in one direction or the other to supply the loose bat to the hopper.

We now come to consider the novel construction and arrangement of the resistance mechanism designed to oppose any desired resistance to the recession of the lower baling members or platens 12 and 13 during the formation of the bale.

A tank 94 for the reception of water or other fluid is disposed at a suitable elevation, usually twenty feet or more above the floor, and from this tank is led a stand-pipe 95, communicating with a union 96, located adjacent to the floor of the gin-house and preferably about midway between the ends of the press. From this union 96 are led a pair of branch pipes 97 and 98, communicating with the lower ends of the cylinders 8 and 9 and controlled by valves 99 and 100, the levers 101 and 102 of which are located just below the clutch-handles 69 and 70, so as to bring all of the controlling devices within convenient reach of the operator or attendant. By opening either of these valves water is permitted to flow into the lower end of the cylinder and elevate the plunger therein to present the platen within the compression-collar for the initiation of a bale. The weight of the column of water in the piping and overhead tank will now be opposed to the recession of the platen; but, as I have heretofore stated, I contemplate the provision of means for opposing different resistances to such recession in order that the bales may be subjected to any desired compression, according to the density required. For this purpose I provide a check-valve 103, having its casing in communication with the union 96 and with by-pass pipes 104 and 105, leading to the branch pipes 97 and 98 at points between the cylinders and controlling-valves. Within these by-pass pipes are located pressure-regulators 106 and 107 of any approved construction—such, for instance, as shown in detail in Fig. 6. These pressure-regulators or relief-valves are capable of opening under back pressure only and may be set to operate when any desired back pressure is exerted, pressure-gages 108 being preferably employed for the purpose of apprising the operator of the resistance opposed to the recession of the platens.

Assuming the parts to be positioned as indicated in the drawings, the operation of my press is as follows: The rotation of the crank-shaft 45 will reciprocate the carriage 14 and operate the carrier 73 to discharge a loose bat from the condenser-casing to the hopper 29. The reciprocatory movement of the carriage will effect the rotary movement of the bat forming, feeding, and compressing rolls 32 and 33, and the loose bat fed into the hopper will pass down between the initial compression-rolls and will be compressed in detail at a point immediately adjacent to the point at which the bat is fed into the press. From the compression-rolls 32 and 33 the bat in a highly-compressed state is fed through the throat 21, defined by the main compression-rollers 19 and 20, and by the reciprocation of the carriage or upper compression member is folded backward and forward in superimposed layers between the platen 12 and the compression-rollers 18 of the upper compression member. It will be observed that as the carriage or upper compression member, the initial compression-rolls, and the loose bat-carrier 73 are all driven from the same shaft—to wit, the crank-shaft 45—each of the several elements operating upon the bat will of necessity move at identically the same speed, and this relation of the parts will be maintained to feed the bat smoothly and evenly irrespective of the speed at which the crank-shaft may be driven. It should be furthermore observed at this point that not only is the bat initially compressed and formed at a point closely adjacent to the point at which the bat is delivered between the compression members of the press, but that by reason of the fact that the bat forming and compressing mechanism is mounted upon and moves with the upper compression member of the press the contiguity of these points will be maintained at all times notwithstanding the reciprocation of the carriage to lay the alternate layers of the bat in opposite directions. As the bat is accumulated between the compression members of the press the platen or lower compression member must of necessity recede, and we have seen how this recession is opposed by hydraulic resistance, the force of which is determined by the pressure-regulators, inasmuch as the latter are set so as to resist the escape of the fluid from the cylinder 8 until the pressure exerted upon the platen by the bale has reached a predetermined point. Ordinarily this resistance is such as to produce a bale having a density of from twenty-five to thirty-five pounds to a cubic foot; but this density may be greatly increased by setting the pressure-regulator in an obvious manner. The bale having been completed, the press is stopped, the frame 27, with its complementary hopper and rolls, is detached from the carriage 14 and attached to the carriage 15, and the position of the clutch-lever 93 is shifted to unclutch the sprocket 76 from the shaft 77 and to clutch the sprocket 85 to the shaft 82. The valve 100 is then opened to permit the ingress of water to the cylinder 9 for the purpose of raising the platen 13 to the compression-collar 23, and the positions of the clutch-handles 69 and 70 are reversed to disconnect the driving-shaft 45 from the power and to connect the driving-shaft 46 thereto. The valve 100 is closed and a second bale is formed by the right-hand baling set.

I now come to an explanation of the manner in which a bale is covered and tied. This explanation I have left until the last, for the reason that the bagging and tying of the bale in accordance with my invention involve what appears to be a distinctly novel method; but while I shall clearly explain the practice of the method incident to the operation of the press I shall make no claim thereto in this application.

Before the cotton-bat is fed between the compression members in the manner heretofore described the bagging $a$ is led across the top of the compression-collar 22, with its ends hanging down, as shown in Fig. 2 of the drawings. As the bale increases in size the bagging will be drawn over the upper edges of the compression-collar and will be held taut along the opposite sides of the bale, moving down with the latter until the bale has been completed. At this time, as has already been explained, the baling set at the opposite side of the press is put in operation, so that a second bale may be in course of formation while the completed bale is being bagged and tied, and my novel method comprehends the bagging and tying of this completed bale while the latter is still subjected to the maximum compression between the compression members. This end is accomplished by passing one end of the bagging up through the throat 21 of the upper compression member, which is then thrown into gear with the driving mechanism, and the end of the bagging will thus be folded across and pressed down upon the top of the bale just as the cotton-bat is compressed and folded during the baling operation. After one or two reciprocations of the carriage the throat is presented to the opposite side of the compression-collar, the other end of the bagging is carried up through the throat 21, and the carriage is again reciprocated to lay this second end of the bagging across the top of the bale in the manner stated. We now have the bale covered or bagged without having withdrawn the compression for a single instant, and we are now ready to apply the ties. This is accomplished in much the same manner. The upper face of the platen is provided with a series of tie-grooves $b$, which extend transversely across the platen in the direction of the reciprocation of the upper compression member, and above the opposite ends of these grooves the side walls of the collar are provided with vertical grooves $c$.

Therefore, the bagging having been applied, the bale-ties are passed through the grooves b, up along the sides of the bale, and through the grooves c of the collar. The ends of the ties at one side of the bale are then passed up through the throat of the compression member 14 and are folded and compressed upon the upper side of the bale by the reciprocation of the carriage. The ends of the ties may now be joined at one of the upper corners of the bale, access being afforded for this purpose through the throat 21, or, if preferred, the ends of the ties at the opposite sides of the bale may be folded over the latter just as the first ends were folded and may then be buckled or otherwise connected to the ties at points intermediate of their lengths in a manner well understood in the art—that is to say, one end of each tie may be folded over the bale and connected to the other end, or both ends may be folded over the top of the bale in opposite directions and secured in any desired manner. This method may be varied somewhat. For instance, the bands may be passed over the compression-collar, together with the bagging, in the first instance, both the bands and bagging being fed downward by the formation of the bale. In this event one end of the bagging and the contiguous ends of the ties could be folded down over the top of the bale simultaneously; but the method I have described more at length would seem to be more desirable.

It is thought that from the foregoing the construction, operation, and many advantages of my press will be clearly apparent; but while the present embodiment of the invention is believed at this time to be preferable I desire to reserve the right to effect such changes, modifications, and variations as may be suggested by experience and experiment and embraced within the scope of the protection prayed.

What I claim is—

1. In a cotton-compress, the combination with a frame comprising tracks or guides, of a platen, a reciprocatory compression member comprising a carriage, mounted to slide between the tracks or guides, and a series of compression-rollers, and means for positively operating two rollers through the reciprocation of the carriage.

2. In a cotton-compress, the combination with a frame comprising tracks or guides, of a platen, a reciprocatory compression member comprising a carriage mounted to slide between the tracks or guides and a series of compression-rollers mounted on the carriage, said series being divided into separate groups defining an intermediate feed-throat, and means for positively operating the two rollers at opposite sides of the throat through the reciprocation of the carriage.

3. In a cotton-compress, the combination with a platen, of a reciprocatory compression member having compression-rollers divided into groups defining an intermediate feed-throat, means for positively driving the compression-rollers at the inner ends of the groups, bat-compressing rolls disposed above the feed-throat, and means for driving said rolls through the reciprocation of the compression member.

4. In a cotton-compress, the combination with a platen, of a reciprocatory compression member having compression-rollers and bat-compressing rolls located above the rollers, and means for operating both the compression-rollers and the bat-compressing rolls through the movement of the reciprocatory compression member.

5. In a cotton-compress, the combination with a reciprocatory compression member provided with two series of compression-rollers defining an intermediate feed-throat, and a platen disposed below said member, of bat-compressing rolls disposed directly above and adjacent to the feed-throat, said rolls being bodily movable with the compression member, and means for rotating said rolls and certain of the rollers through the movement of the compression member.

6. In a cotton-compress, the combination with a platen, and a reciprocatory compression member comprising a carriage and a series of compression-rollers divided into separated groups defining an intermediate feed-throat, of bat-compressing rolls located opposite and immediately adjacent to said throat to compress the bat immediately prior to its delivery to the press, and means for operating the bat-compressing rolls and certain of the rollers through the movement of the carriage.

7. In a cotton-compress, the combination with a platen, and the tracks or guides, of a reciprocatory compression member comprising a carriage and a series of compression-rollers separated into groups to define an intermediate feed-throat, pinions mounted upon the two main compression-rollers at opposite sides of the throat, a rack secured to one of the tracks or guides and engaging said pinions, a second rack mounted on one of the tracks or guides, bat feeding and compressing rolls disposed directly above and adjacent to the feed-throat and movable bodily with the carriage, and drivers for said rolls, said drivers having engagement with the second rack and designed to be operated by the reciprocation of the carriage.

8. In a cotton-compress, the combination with a platen, and a reciprocatory compression member comprising a carriage and a series of compression-rollers divided into separated groups defining an intermediate feed-throat, of a frame supported upon the carriage for movement therewith and provided with a hopper, a pair of bat-compressing rolls disposed at the bottom of the hopper and directly opposite the feed-throat, and means for operating the bat-compressing rolls to feed a bat continuously to the press during the movement of the carriage in opposite directions.

9. In a cotton-compress, the combination with a pair of duplicate baling appliances, each comprising a reciprocatory compression member and a platen, of a pair of driving-shafts connected to said compression members to reciprocate the same, a power-shaft geared independently to each of said driving-shafts, and clutches controlling the operative connection between the power-shaft and said driving-shafts, whereby either, both or neither of said members may be reciprocated as desired.

10. In a cotton-compress, the combination with a pair of duplicate baling appliances, of bat feeding and pressing mechanism disposed to compress the bat immediately prior to its delivery to a baling appliance, and means for detachably connecting said bat feeding and pressing mechanism to an element of either of the baling appliances for movement therewith.

11. In a cotton-compress, the combination with a pair of baling appliances, and driving mechanism therefor, of a condenser-casing, and a substantially horizontal carrier disposed to receive the cotton from the condenser and arranged to deliver a loose bat above either baling appliance.

12. In a cotton-compress, the combination with a pair of baling appliances, and driving mechanism therefor, of a substantially horizontal carrier arranged to deliver a loose bat to either baling appliance, and means for operating the carrier from the driving mechanism of the press.

13. In a cotton-compress, the combination with a pair of baling appliances, and driving mechanism therefor, of a substantially horizontal carrier disposed to deliver a loose bat from either end thereof to one of the baling appliances, means for operating the carrier, and means for reversing the direction of movement of said carrier to effect the delivery of the bat to the desired appliance.

14. In a cotton-compress, the combination with a pair of baling appliances, of a condenser-casing, a carrier disposed adjacent to the lower end of the condenser-casing and having its opposite ends disposed above the baling appliances, means for operating the carrier, and means for controlling the direction of movement thereof.

15. In a cotton-compress, the combination with a pair of baling appliances, of a condenser-casing, a carrier therein having its opposite ends disposed above the baling appliances and designed to feed a loose bat thereto, and means for operating the carrier.

16. In a cotton-compress, the combination with a pair of baling appliances, and driving mechanism therefor, of a condenser-casing, an endless carrier located within the casing to discharge a loose bat at a point above either baling appliance, and gearing connecting said carrier with the driving mechanism of the press.

17. In a cotton-compress, the combination with a pair of baling appliances, and driving mechanism therefor, of a condenser-casing, a substantially horizontal endless carrier located within the casing to discharge a loose bat at a point above either baling appliance, means for operating the carrier, and means for reversing the direction of movement thereof.

18. In a cotton-compress, the combination with a pair of baling appliances, and driving mechanism therefor, of a substantially horizontal carrier designed to deliver a loose bat from either end thereof, and a hopper arranged for disposal above either of the baling appliances to receive the bat from the carrier.

19. In a cotton-compress, the combination with a pair of baling appliances, and independent driving-shafts therefor, of a condenser-casing, an endless carrier disposed to receive the cotton from the condenser-casing and to deliver a loose bat at a point above either baling appliance, and means for operating the carrier from either of the driving-shafts.

20. In a cotton-compress, the combination with a pair of baling appliances, and independent driving-shafts therefor, of an endless carrier for delivering a loose bat at a point above either baling appliance, independent gearing connecting each of the driving-shafts with the carrier, said gearing being arranged to cause said shafts to operate the carrier in different directions, and means for throwing the shafts into and out of gear with the carrier.

21. In a cotton-compress, the combination with a pair of baling appliances, each comprising a reciprocatory compression member, of a pair of driving-shafts operatively connected to said members, a power-shaft geared to both driving-shafts, a bat-carrier disposed to deliver a loose bat to either baling appliance, gearing connecting said carrier with the driving-shafts, and means for throwing either of said driving-shafts into and out of gear with the carrier.

22. In a cotton-compress, the combination with a pair of baling appliances, each comprising a reciprocatory member, of a pair of driving-shafts operatively connected to said members, a power-shaft geared to the driving-shafts, a bat-carrier disposed to deliver a loose bat at a point above either baling appliance, gearing connecting said carrier with both of the driving-shafts, means for throwing either of said shafts into and out of gear with the carrier, and means controlling the operative connection between the power-shaft and the driving-shafts.

23. In a cotton-compress, the combination with a pair of duplicate baling appliances, of a carrier disposed to deliver a bat at a point above either appliance, and bat feeding and pressing mechanism having means of attachment to either of the baling appliances and comprising a hopper disposed to receive a loose bat from either end of the carrier.

24. In a cotton-compress, the combination with a pair of duplicate baling appliances, and driving mechanism therefor, of a condenser-casing, a carrier located within the condenser-casing and arranged to deliver a loose bat above either baling appliance, bat feeding and compressing mechanism disposed to compress the bat immediately prior to its delivery to a baling appliance, means for operating the carrier from the driving mechanism, means for controlling the connection between the driving mechanism and the baling appliances, and means for reversing the movement of the carrier.

25. In a cotton-compress, the combination with duplicate baling appliances, and independent controlling devices therefor, of a condenser-casing, a carrier therein having its opposite ends disposed above the baling appliances, bat feeding and compressing mechanism arranged for disposal in operative relation with either baling appliance, and means controlling the direction of movement of the carrier to cause the delivery of the bat at a point above either baling appliance.

26. In a cotton-compress, the combination with duplicate baling appliances, driving mechanism, and controlling devices controlling the operative connection of the baling appliances with the driving mechanism, of a condenser-casing, an endless carrier located within the casing to receive a loose bat and to discharge the same at a point above either baling appliance, gearing connecting said carrier with the driving mechanism, means for reversing the direction of movement of the carrier, a frame adapted for connection with either baling appliance, and provided with a hopper for the reception of the loose bat from the carrier, bat-compressing rolls mounted in said frame to compress the bat immediately prior to its delivery to the press, and means for operating the bat-compressing rolls through the movement of an element of the adjacent baling appliance.

27. In a cotton-compress, the combination with a pair of duplicate baling appliances, and driving mechanism, of a condenser-casing having openings located at its opposite sides and directly above the baling appliances, a pair of feed-rollers located in each opening, an endless carrier passed around the lower rollers and designed to receive a loose bat and to deliver the same at either side of the casing, gearing connecting the rollers at one side of the casing, independent gearing connecting each of said rollers with the driving mechanism, and means for controlling the connection of each of said rollers with the driving mechanism, whereby the carrier may be operated in either direction to discharge the loose bat at a point above either of the baling appliances.

28. In a cotton-compress, the combination with a pair of duplicate baling appliances, each comprising a reciprocatory compression member, and independent driving-shafts operatively connected to said members, of a condenser-casing, an endless carrier within said casing for delivering a loose bat at a point above either baling appliance, independent gearing connecting each of the driving-shafts with the carrier, and means for throwing said carrier into and out of gear with either of said shafts.

29. In a cotton-compress, the combination with a pair of duplicate baling appliances, each comprising a reciprocatory compression member, of a pair of driving-shafts operatively connected to said members to drive the same, a power-shaft geared to both of the driving-shafts, a bat-carrier disposed to deliver a loose bat at a point above either baling appliance, gearing connecting said carrier with both of the driving-shafts, means for throwing either of said driving-shafts into and out of gear with the carrier, means controlling the operative connection between the power-shaft and the driving-shafts, and bat feeding and compressing mechanism disposed to compress the bat immediately prior to its delivery to a baling appliance.

30. In a cotton-compress, the combination with a pair of duplicate baling appliances, and driving mechanism therefor, of a condenser-casing, a substantially horizontal carrier located within the condenser-casing and arranged to deliver a loose bat above either baling appliance, bat feeding and compressing mechanism disposed to compress the bat immediately prior to its delivery to the press, and means for operating the carrier from the driving mechanism of the press.

31. In a cotton-compress, the combination with duplicate baling appliances, and independent controlling devices therefor, of a condenser-casing, a carrier having its opposite ends disposed above the baling appliances, and means controlling the direction of movement of the carrier to cause the delivery of the bat at a point above either baling appliance.

32. In a cotton-compress, the combination with the compression-collar of a height considerably less than the height of the bale, of a platen arranged to operate within and capable of depression below said collar, and a reciprocatory compression member located above the collar to fold a bat of cotton within the collar for compression between the platen and the reciprocatory compression member.

33. In a cotton-compress, the combination with a support, of a shallow compression-collar, a platen arranged to be received within and for depression below said collar, a reciprocatory compression member located above the collar to fold a cotton-bat within the collar while said bat is being subjected to compression between the platen and the reciprocatory compression member, said platen being provided with grooves extending in the direction of the reciprocation of the compression member, whereby the reciprocation of the compression member may be utilized to assist in the bagging and tying of the bale while the latter is still under compression.

34. In a cotton-compress, the combination with a support, of a shallow compression-collar, a platen arranged to be received within and depressible below said collar, and means located above the collar to fold a cotton-bat back and forth within the same, said platen and collar being provided with coincident grooves.

35. In a cotton-compress, the combination with a support, of a shallow compression-collar, a platen arranged to be received within and for depression below said collar, a reciprocatory compression member located above the collar and designed to fold a cotton-bat back and forth within the collar while said bat is being subjected to compression between the platen and the reciprocatory compression member, said platen being provided with grooves extending in the direction of the reciprocation of the compression member, and said collar being provided in its inner faces with grooves disposed directly above the grooves in the platen, whereby the reciprocation of the compression member may be utilized to assist in the bagging and tying of the bale while the latter is still under compression.

In testimony that I claim the foregoing as my own I have hereto affixed my signature in the presence of two witnesses.

JAMES K. COCHRAN.

Witnesses:
T. H. JONES,
C. C. CURTIS.